INVENTORS
LEO C. DESHETLER &
BY EUSTACE H. MUMFORD

ATTORNEYS

April 18, 1967 L. C. DE SHETLER ET AL 3,314,775
CYLINDER MOUNTING ON I.S. TYPE GLASSWARE FORMING MACHINE
Filed July 23, 1963 4 Sheets-Sheet 4

INVENTORS
LEO C. DE SHETLER &
EUSTACE H. MUMFORD
BY
J. R. Nelson
and W. H. Schaich
ATTORNEYS United States Patent Office 3,314,775
Patented Apr. 18, 1967

3,314,775
CYLINDER MOUNTING ON I.S. TYPE GLASS-
WARE FORMING MACHINE
Leo C. De Shetler, Toledo, Ohio, and Eustace H. Mumford, Ottawa Lake, Mich., assignors to Owens-Illinois, Inc., a corporation of Ohio
Filed July 23, 1963, Ser. No. 296,986
6 Claims. (Cl. 65—167)

This invention relates to the parison forming apparatus on a glassware forming machine, and more particularly to improved apparatus enabling the parison forming unit to be readily and conveniently converted in its operation on the machine from the press-and-blow method to blow-and-blow method, or the parison forming unit changed from one job to another with a minimum of downtime of the machine.

As a brief summary of the invention, the plunger cylinders for the glass forming machine are designed to simplify their removal and replacement at the time of a job change or process change. In its structural aspects, the invention is realized by the inclusion in the combination of a plunger cylinder foot or platen which is supported in the base of the machine and includes a height adjusting rod. This foot or platen will be common to all types of plunger cylinders to be used on the machine. The moveable platen acts as the support for the plunger cylinder and includes a manifold block for all air and other fluid hose connections for the cylinder units of the machine. The top of the platen has upstanding plugs which enter recesses or holes in the bottom face of the plunger cylinder head, thus making a detachable, sealing connection for plural fluid lines between the platen and the cylinder. All of the hoses that are connected into the platen member are permanently installed. These hoses are under the control and connected to the machine timing valve, the latter being constructed and operated off of a machine timing drum in the usual manner.

The invention has as one of its objects the provision of a means as aforesaid for converting the machine from a press-and-blow method of operation to a blow-and-blow method, or vice versa, as well as conversion of the machine from one job or a size to a different job or size.

It is another object of the invention to provide in the plunger cylinder mounting platen, an adjustable positioner for establishing the proper operating height position of the cylinder on the machine with regard to the particular job or method by which the machine is to operate.

It is still another object of the present invention to provide a readily removable "quick change" plunger cylinder unit capable of converting the apparatus for forming glassware from one of said methods to the other or converting jobs or sizes of any given method within a minimum amount of time and with a minimum of detailed and skilled alteration or take-down of the machine in said conversion.

Still another object of the invention is to provide a quick conversion plunger cylinder unit on existing glass forming machines which can be readily adapted thereto with a minimum of revision of the machine, which incorporates a design of simplicity of construction, and which is adaptable to existing glass forming machine apparatus, i.e. the timing apparatus, for permitting the usual and desirable timed operation in a sequence in forming glassware.

The specific nature of this invention, as well as other objects and advantages thereof, will become apparent to those skilled in the art from the following detailed description, taken in conjunction with the annexed sheets of drawings, on which, by way of preferred example only, are illustrated embodiments of this invention.

In the drawings:

FIG. 1 is a vertical sectional elevational view through the parison forming unit of an I.S. type (individual section) of glassware forming machine, including a vertical pressing plunger, together with the improved means provided by the invention for permitting quick change and replacement of the pressing cylinder unit. The pressing cylinder unit as shown on FIG. 1 illustrates the press-and-blow method of operation characterized in the forming of wide mouth ware.

As a basis of explanation in the present invention, the terms "press-and-blow" method and "blow-and-blow" method is intended to be encompassed by the following types of operation:

The "blow-and-blow" method is operated by delivering a charge or gob of glass into a "parison" mold where it is to be shaped by means of air pressure to conform to the interior cavity of this mold and form a hollow "parison" shape of glass article. In this method, the neck of the glassware is formed first, and then the remainder of the glassware is formed by expanding the parison by pressurized air.

An example of the blow-and-blow method of forming glassware is explained in U.S. Patent No. 1,911,119, which disclosure is related specifically to the mentioned I.S. type of machine.

In the "press-and-blow" method, a charge of molten glass is delivered to a mold and pressed by means of a reciprocating plunger to the shape of the interior cavity of the parison mold. The parison so produced is then transferred to a blow mold and by means of air under pressure is blown to final form. The press-and-blow method is described in U.S. Patent No. 2,508,891.

As mentioned above, the present invention is directed particularly to a foot mounting means enabling removal of the pressing plunger as a unit for readily converting the apparatus from operation by the press-and-blow method to the blow-and-blow method, and vice versa. One form of apparatus for forming glassware having a means for converting the machine from a press-and-blow method to a blow-and-blow method is described in U.S. Patent No. 2,702,444. In that last-mentioned patent, the means for converting the machinery from one form of operation to the other requires the removal of the plunger element itself on the plunger cylinder. It contemplates the use of the same motor cylinder and its connections to the machine timing valve, and is made by the usual manner to supply the reciprocating operational force on either form of plunger that is being employed.

The present invention provides for conversion by removal of the plunger cylinder as a unit, this accomplishment being made possible by building a plunger cylinder foot and height adjusting mechanism that will be common for all plunger cylinders used on the machine. The plunger cylinder foot not only acts as the support for the cylinder but is a manifold block for conducting all air or other fluids that may be needed to be supplied to the cylinder. This manifold block is permanently connected by lines or hoses to the main machine timing drum valve mechanism. In the cylinders, the lines piped into the manifold section of the cylinder foot correspond with plug connectors that enter ports in the appropriate lines of the cylinder for the particular type of machine cylinder that is being operated.

Figure 1:
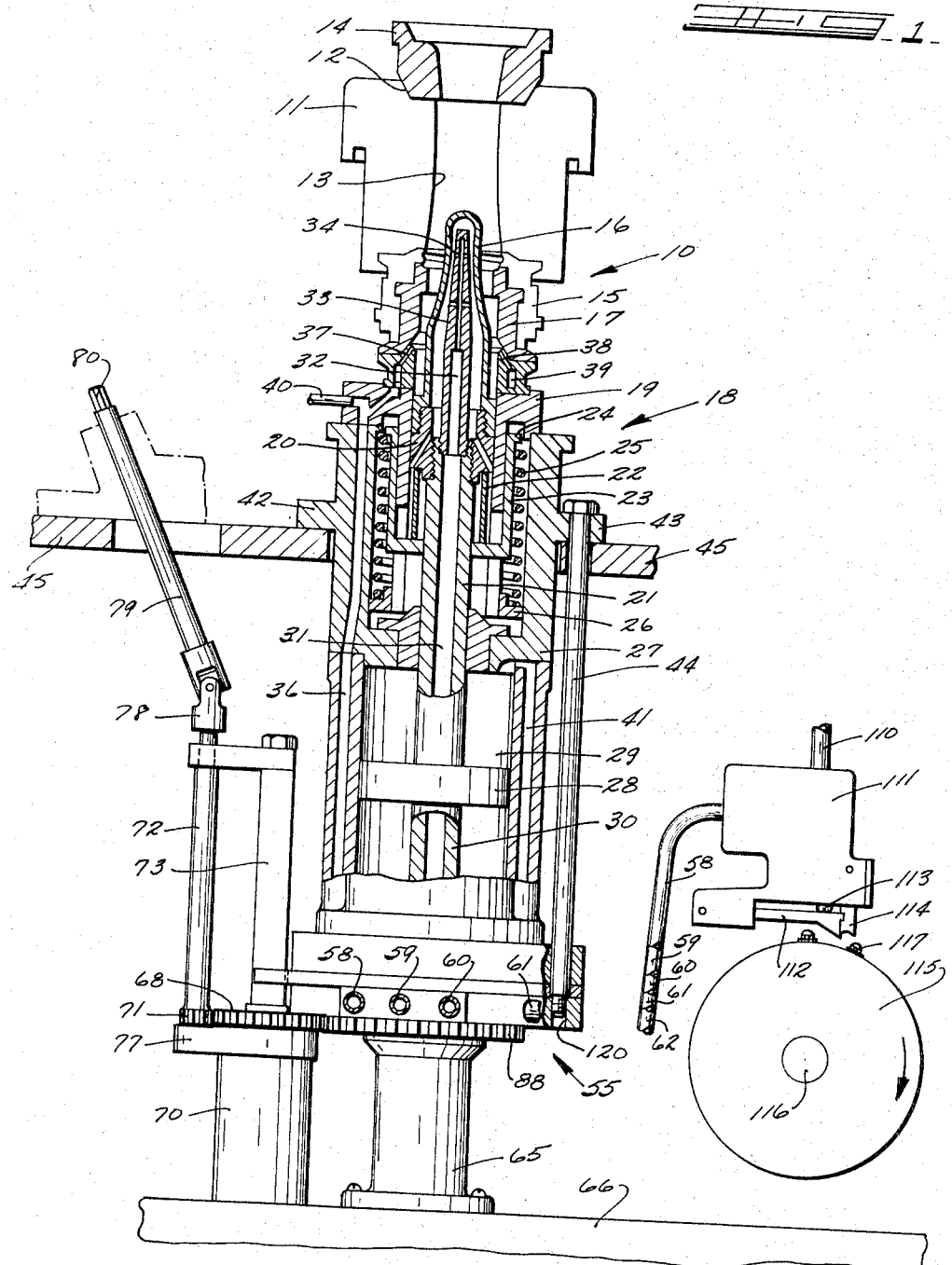

As a specific form of the invention, which is presented herein as a preferred form, there is shown on FIG. 1 a parison forming assembly designated generally as 10. The assembly 10 is an integral part of an apparatus for forming glassware by the press-and-blow method. In the ensuing description of the drawings in detail, wherever like numbers are employed in connection with the description they refer to and indicate like elements.

The apparatus includes an inverted blank mold 11 mounted on suitable mold arms (not shown) moveable toward and away from each other to open and closed molding positions. In the closed position, as shown, the mold defines a parison molding cavity 13 which includes a top opening 12 having a baffle seating surface for receiving a funnel and baffle member 14. The mold sections of the mold 11 close on a parting line or seam where the mating faces of the mold sections join in abutting relation. A neck mold 15 is mounted on and carried by the I.S. invert arms (not shown) in a conventional maner. The neck mold defines a circular cavity that forms a particular finish of a press-and-blow glass container, usually wide-mouth ware, and the neck mold cavity is contiguous and in registry with the blank mold cavity 13. The top of the parison forming cavity 13 is alternatively closeable by removal of the funnel 14 and inserting a baffle (not shown) of conventional construction. The just-described mechanism comprised of the neck mold 15, blank mold 11, and funnel 14 or baffle are mounted on the frame of the section of the I.S. machine for conventional operation under the press-and-blow method. Insofar as this invention is concerned, these parts do not constitute any form of the invention except insofar as they cooperate with the underlying pressing plunger unit.

The plunger and its cylinder mechanism is provided for press-and-blow operation such that the plunger is moved to a lower loading position and a raised pressing position. The plunger in the pressing position forms the glassware finish in the neck mold and presses the glass to the parison shape in the blank mold. The plunger is also hollow and fluid cooled so that heat is removed from the parison in a planned manner. The plunger 16 is housed within the thimble 17 upon which the neck rings 15 open and close in their registered glass molding position at the parison forming station. The plunger cylinder 18 includes a cylinder head 19 secured to the overlying hollow annular thimble 17 and has a vertical bore which receives a plunger guide 20. The plunger 16 is threaded to the plunger guide which is in turn threaded to the hollow piston rod 21. The plunger guide 20 is retained by a cylindrical disc 22 which bears against the lower flange of the retainer 23, the latter being axially slidable on the outer portion of the guide surface of the cylinder head 19. The member 23 has radial ears 24 which retain the coil spring 25 between it and the lower flange 26 rigidly secured on the wall of the cylinder 27. This coil spring 25 applies an upward thrust force onto the plunger 16 and its piston rod 21.

The piston rod 21 is connected to the piston 28 axially slidable in the cylinder chamber 29. The piston rod 21 has a lower telescopic section 30 that has a hollow passage 31 for receiving a fluid coolant, such as air. The passage 31 connects to the interior hollow stem 32 of the plunger cooling pipe 33. This pipe has radial passages 34 for the coolant supplied against the internal shell of the pressing plunger 16. The coolant fluid expelled through these ports 34 is exhausted from the system through the passages 35 which connect to atmosphere. In the cylinder wall 27 as shown on the left-hand side in FIG. 1, is an axially extending passage 36 which connects to a series of passages in the cylinder head connected to the oblique passage 37. This system is used for applying a lubricant or mold dope. The passage 37 has a counter part 38 connected by an annulus 39 which communicates with the supply in the pipe 36 through the bored portion of the cylinder head 19. An auxiliary pipe 40 is secured to the side of the cylinder head 19 and communicates with the passage 36 and chamber 39. This pipe 40 is utilized for the introduction of a supply of oil or lubricant. Also along the cylinder wall 27 is a passage 41 which either introduces air under pressure or exhausts air from the cylinder chamber at the top side of the piston 28. At the proper timed sequence in the operation, the introduction of air under pressure into pipe 41 will cause downward movement of the piston 28 and withdrawal of the plunger 16. The exterior sides of the cylinder 27 are also provided with flanged ears 42 and 43. The one ear 43 is shown as receiving a threaded retaining rod or shaft 44 which extends down through the frame member 45 upon which the flange ears 42 and 43 of the cylinder rest.

Figure 2:
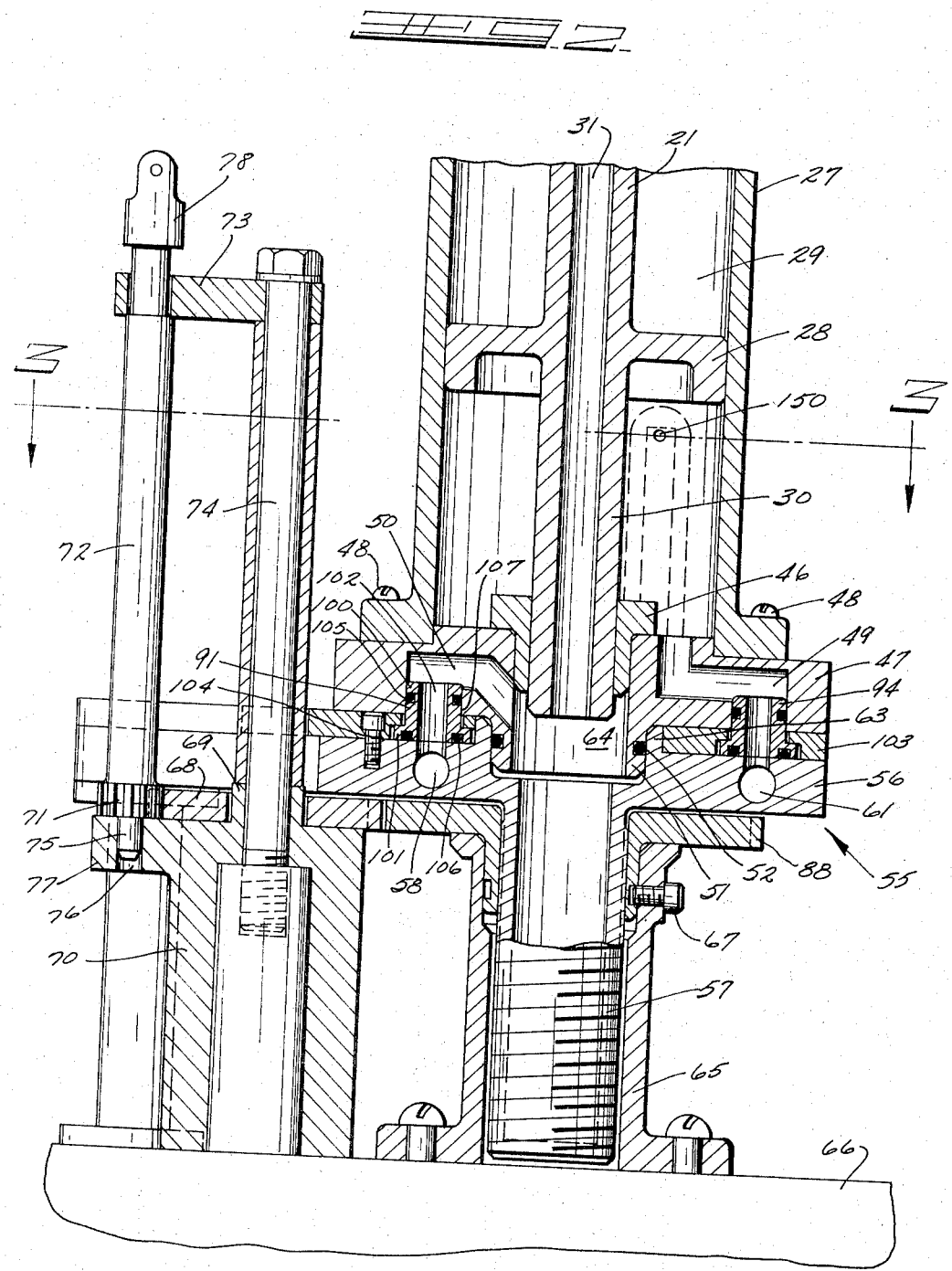
FIG. 2 is a detailed sectional elevational view taken along lines 2—2 on FIG. 3, and shows the lower section of a press-and-blow plunger cylinder unit as it is installed in place for operation on the foot member of the present invention.

Referring now to FIG. 2, the lower section of the cylinder 27 is shown as including the telescopic extension 30 of the piston rod which fits into a gland member 46. This gland member is secured to the lower cylinder head 47 which is attached to the cylinder 27 by the cap screws 48. The lower cylinder head 47 includes a passage 49 and a passage 50. The cylinder head also has a central hub portion 51 which is provided with O-type sealing rings 52.

Figure 3:
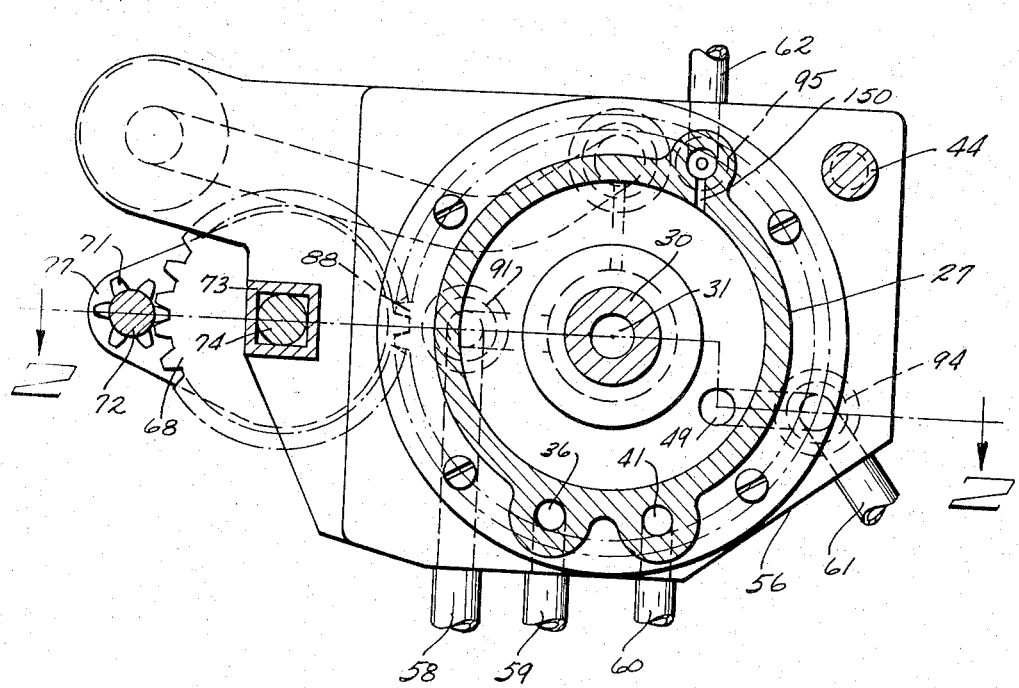
FIG. 3 is a plan sectional view taken along line 3—3 on FIG. 2.
Figure 4:
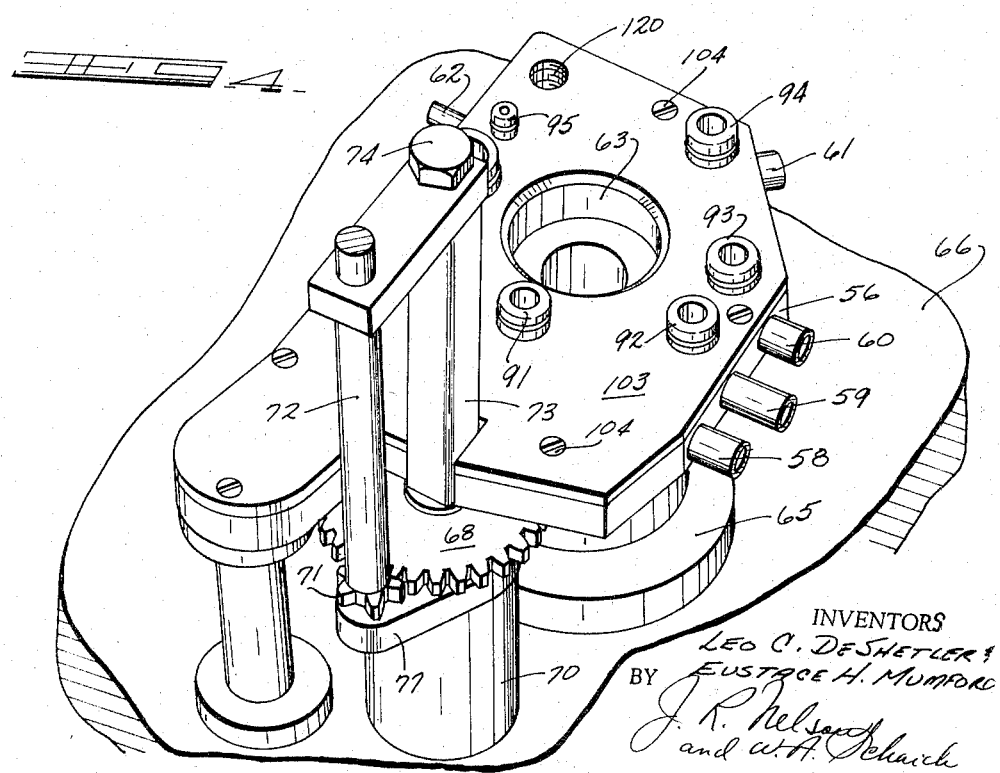
FIG. 4 is a perspective view of the foot member of the present invention and corresponds with the structure shown in the cross-sectional view of FIG. 2.

As shown on FIGS. 2–4, the novel foot platen or foot member of the invention, referred to generally as element numbered 55, will now be described. The foot member is comprised of the platen casting 56 that has a central threaded stub shaft 57 integral therewith. The platen 56 has a plurality of inlet connections, such as the hose connections 58, 59, 60, 61 and 62, as may be seen on FIGS. 3 and 4. The platen 56 is centrally counter bored and includes a receiving flange 63 into which the hub 51 is received and sealingly retained by the O-rings 52. Thus, the cooling fluid which is piped into inlet pipe 58 will have its connection with the passage 50 in the lower cylinder head 47, which in turn connects into the lower annular chamber 64.

This chamber 64 communicates with the passage of the hollow stem 30 that leads to the spray passages of the pipe 33 in the interior of the plunger 16.

As may best be seen on FIG. 2, the lower stub shaft 57 of the platen member 56 is threadedly secured in the threaded interior of gear 88. The gear 88 is bearing supported on the upright hub 65 that is secured to the base casting 66 of the glassware forming machine. The retaining screw 67 secures the gear 88 in this hub 65. The spur gear 88 is in mesh with an intermediate gear 68 that is rotatable on the vertical hub 69 of the casting 70 secured to the machine base 66. The intermediate gear 68 is in mesh with the smaller drive pinion 71 that is connected for rotation with the shaft 72 housed in the bearings of the bracket arm 73. This bracket arm is fitted on the central hub of the casting 70 and secured in place by the threaded rod 74. The lower end of the adjusting shaft 72 has a rotatable stub shaft 75 that fits in a journal 76 on a flange 77 of the casting 70. The adjusting shaft 72 has a universal joint coupler 78, which is shown on FIG. 1 in greater detail as being coupled with the angled shaft 79 that extends upwardly through the machine frame member 45. The shaft 79 is journaled thereon in a bearing of the casting indicated by the dash-line outline. The upper end of the shaft 79 has a wrench-end 80 which will receive an adjusting wrench for manually turning shafts 79 and 72. Through the gear train 71, 68 and 88, the turning movement will cause either a raising or lowering adjustment of the foot 55 by the threaded connection between the carrier of the gear 88 and the threaded stub shaft 57 on the lower end of the foot member platen 56.

Referring again to FIGS. 2–4, the platen 56 of the foot member in effect serves as a manifold for the hose connections 58–62, referred to above, and each of these hose connections have internal passages which terminate in vertical upstanding lugs or plugs, respectively numbered hereon as 91–95. These plugs 91–95 are strategically located about the top part of the platen 56 so as to correspond with recesses in the lower cylinder head 47 of the cylinder 27. The mating relationship will make the appropriate hose connections into the cylinder. Turning attention to the plugs, each of the plugs 91–95 are constructed as follows. They each constitute a cylindrical hollow member having an upstanding hollow cylindrical body 100 and a lower enlarged annular flange 101. The plug 100, 101 is retained in registry so that its central passage 102 will connect to a respective passage in the platen 56 of the foot member by a retaining disc 103. This retaining disc is fastened onto the platen 56 by the cap screws 104. As may be seeen on FIG. 2 specifically, each of the plugs 91–95 is provided with O-type sealing rings 105 and 106. The sealing rings 105 form a fluid seal with the wall of the bored recesses in the lower cylinder head 47, such as shown at 107, and the rings 106 form an air tight seal of the upper surface of the platen 56 and the adjacent lower surface of the flange portion 101 of the plugs.

As is specifically shown on the drawings, connections are provided from each hose connection in foot member 55 and its platen 56 connect respectively by individual passages extending to the upright plug means or plug members. For example, hose connection 58 is connected into plug 91. The passage of fluid through pipe 59 is similarly connected to plug 92. Similarly, pipe 61 is connected to plug 94 and pipe 62 is connected to plug 95. Referring specifically to FIG. 1 and the press-and-blow pressing cylinder assembly 18, the plugs 91–95 are arranged to make their connections into the respective lines of the cylinder as follows. The line 58 and its plug connector 91 will make a fluid connection into the passage 50 of the lower cylinder head 47 for supplying the cooling fluid to the pressing plunger 16. The hose connection 61 through its plug connector 94 will connect into the passage 49 in the lower cylinder head 47 and supply operating air under pressure to the lower side of the cylinder chamber 29 in moving the piston 28 vertically upwardly, or in exhausting fluid in that portion of the chamber as the piston 28 moves downwardly. The hose connection at 60 and its plug connector 93 will connect into the passage 41 of the cylinder to supply air under pressure to the upper end of the cylinder chamber 29 in driving the piston 28 downwardly, or for exhausting fluid from that portion of the cylinder chamber, whenever the piston 28 is moving upwardly. The hose connection at 62 and its plug connector 95 fit in the recess in the lower cylinder head 47 to make a fluid connection with a lubricator port 150 of the cylinder 27. This supplies lubrication to the cylinder-piston mechanism. The hose connection at pipe 59 through its plug connector 92 is utilized for supplying fluid under pressure to the passage 36 in the cylinder. The fluid pressure in this passage functions to apply mold dope or lubricant to the plunger 16 and mold cavity of mold 11. The fluid lines or hose connections 58–62 are each respectively connected into the conventional machine timing valve system for the controlled application of fluid under pressure to the plunger cylinder mechanism at the proper time for performing the sequence of operation required in the particular type of method being performed on the machine. In the present example under description the operation is shown for the press-and-blow method of operation of the cylinder mechanism 18. The various operating functions of the mechanism are performed by fluid pressure. This pressure is derived from a source, such as air pressure in line 110 on FIG. 1. The valve block 111 includes plural valves in a bank which are individually connected into one of the lines 58–62. Each valve in the valve block is capable of connecting at the appropriate time, the supply line 110 and the operating portion of the mechanism by the line connection of the foot member to the cylinder head. Each valve in the valve block 111 has an independent operating means including a lever 112 which is adapted to be actuated to move the valve between a closed position in which the operating function has a connection to atmosphere for exhaust, or otherwise, in open position in which the particularly operating function forms a connection of the operating pressure source in line 110 to the output line of the valve, such as any one of the pipes 58–62. Each valve is shifted to the open position by the upward rocking movement of its lever 112 which raises the spring loaded valve stem 113 of its associated valve. The lever is moved to such a point that a notched latch member 114 engages a projection on the former. This holds the valve open.

Below the valve block 111 is a rotary drum 115 on shaft 116 which is driven at constant speed in one direction (clockwise on FIG. 1), The drum has undercut grooves opposite each of the individual valves and its operating lever 112. In each of these grooves there are secured one or more buttons, such as shown at 117 and 118. The buttons 117 are short buttons and are adapted upon engagement with a corresponding lever 112 to move it upwardly and latch the valve stem 113 open by the latch 114. The buttons 118, which are located rotationally behind the buttons 117, are long buttons and are so arranged to not only raise the levers 112 associated therewith to the point where the projection might engage in the notch of the associated latch 114, but also lift the lever 112 past the latch 114 and trip it to permit the valve to be closed under the influence of its internal spring (not shown) which biases the valve stem 113. The time variation or timing sequence for connecting the air pressure source is adjustable by peripheral positioning of each set of the buttons 117, 118 on the drum 115.

Thus, assuming operation is needed of the just above-described example of the invention under press-and-blow method the press-and-blow assembly 18 is installed by lowering it onto the foot member 55 such that the various plugs 91–95 fit respective recesses in the lower cylinder head 47 of the cylinder thereby making fluid tight line connections into the machine timing drum for operation of the sequence of the press-and-blow cylinder mechanism. The cylinder mechanism is secured in place by tightening the threaded rod 44 into the receiving threads of the bore 120 of the underlying foot member 55, as shown on FIG. 1. This is the only fastening member needed under the present invention to secure the cylinder assembly of the press-and-blow mechanism onto the machine. All hose connections are made automatically to the timing drum system by the registered positioning of the cylinder onto the foot member.

Figure 5:
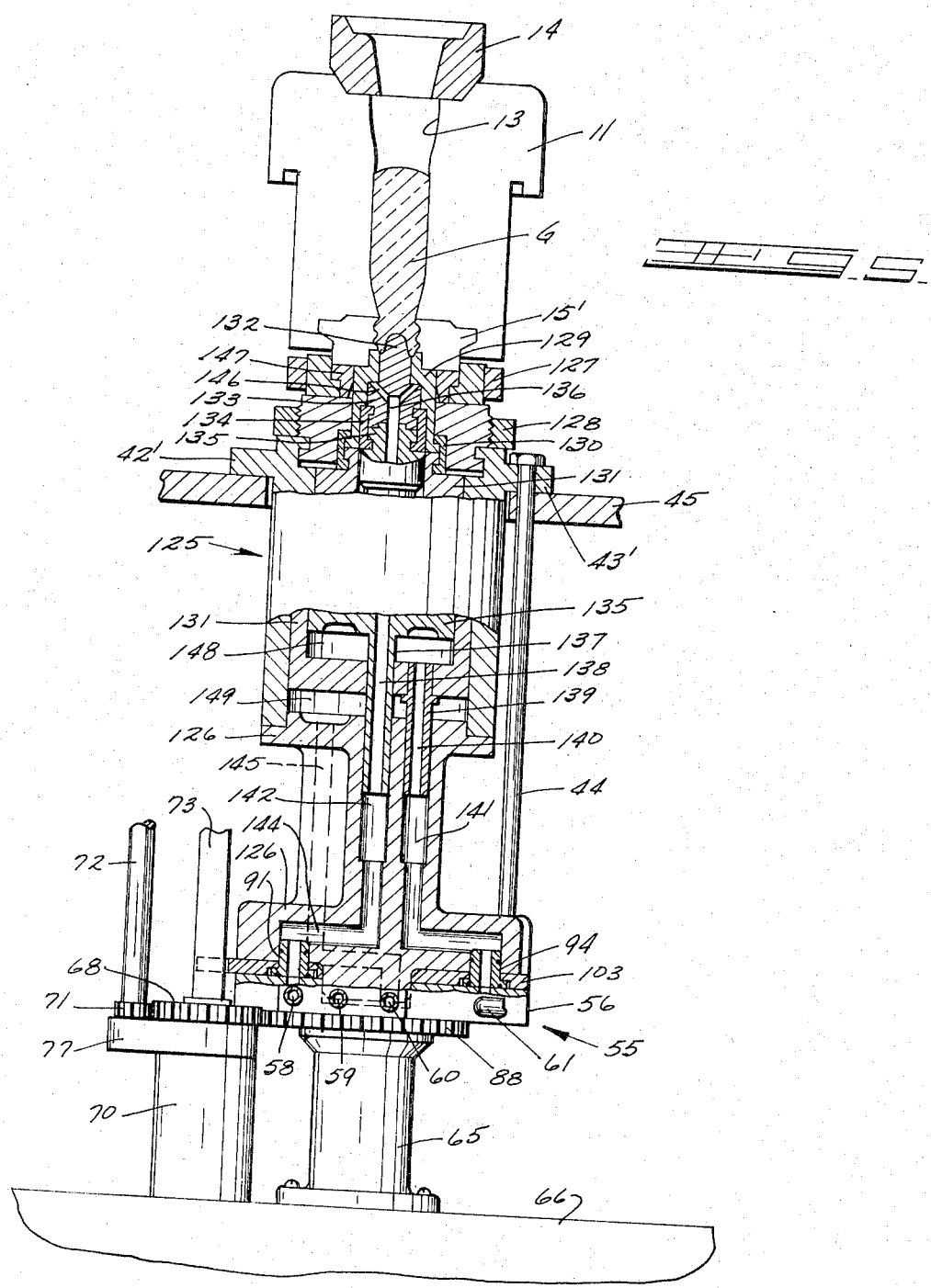
FIG. 5 is a sectional elevational view similar to FIG. 1 showing the plunger cylinder unit employed in the invention after it is converted to the blow-and-blow method of operation, as is characteristic in forming narrow neck ware on an I.S. machine.

Whenever it is desired to change this operation from the press-and-blow method to the blow-and-blow method, the cylinder mechanism 18 as shown on FIG. 1 is removed. This is accomplished by loosening the threaded shaft fastener 44 and lifting the entire assembly 18 vertically upwardly through the accommodating space in the machine frame portion 45. In its place is lowered and secured a blow-and-blow plunger cylinder mechanism referred to generally as 125 on FIG. 5. The foot member 55 supported on the machine base 66 is the same as previously described. The blow-and-blow cylinder mechanism 125 has a lower cylinder heat casting 126 which has the same arrangement of recesses for receiving the plugs 91 and 95 (see FIG. 4) as was the case with the press-and-blow cylinder mechanism 18 shown on FIG. 1. The remainder of the difference of the mechanism resides in the necessary operating differences of the blow-and-blow apparatus. This will now be briefly described.

Associated with the underside of the neck mold 15' are the neck mold invert arms 127 which position the neck mold at an operating parison forming position. A neck pin mechanism is comprised of an outer thimble 129 having an upper sleeve that fits into the lower end of the neck mold. The top radial edge of the thimble cooperates in the molding position with the neck mold to define the neck rim on the finish of the blow-and-blow formed article. The thimble 129 is connected by the clamp 130 to the outer hollow piston 131 of the fluid operated cylinder piston assembly 125. This assembly includes the cylinder housing provided with integral flange 42' and 43' which bear against the machine frame member 45. The flange portion 43' is bored to receive the retaining shaft 44 which is threadedly connected at 120 into the platen 56 of the foot member 55 in the same manner as is shown on FIG. 1. The cylinder 125 has an upper cylinder head 128 which retains the clamp 130 and forms a reciprocal guide for the thimble 129. Slidable axially in the cylinder 125 is the hollow lower piston member 131. This member 131 is loaded against the force of a coil spring (not shown) in the usual fashion which normally lowers or retracts piston 131 and thimble 129. A second piston member 135 is co-axially mounted for movement in the piston member 131. A plunger or neck pin 132 is attached by means of the clamp 134 to the upper end of the piston 135. The plunger 132 of this assembly is adapted to slide axially in the thimble sleeve 129. A second coil spring (not shown) is compressed against the inner piston 135 to normally lower or retract the neck pin 132. At the underside of the piston 135 is a hollow tubular extension 137 telescopically received in the bore 142 at the lower cylinder head 126 of the assembly. This tubular extension 137 has an axial passage 138 extending through the piston 135 and connected into an aligned passage 136 that branches angularly at plural passages 146. The thimble 129 is guided by the guide ring 147 about which the neck rings 15' and the mold sections 11 close to locate the latter in a piloted molding position. The piston 131 provides an internal cylinder 148 which accommodates the second piston 135. Offset in the underside of piston 135 is a lower tubular extension 139 telescopically received for sliding movement in the correspondingly bored passage 141 in the lower cyclinder head 126. This tubular member 139 has a passage 140 connected with the lower end of the cylinder chamber 148. The passage 141 branches into an end port which will receive the upright plug member 94 of the foot 55. The construction of the various elements of the foot 55 is given above. Fluid under pressure is thus furnished by the connection of lines 61 into the machine valve 111 (FIG. 1) operated under the control of the machine timing drum 115. At a proper time and interval, fluid under pressure will thus enter the pipe 61 and connect into the plug 94 and move the piston 135 and the plunger 132 upwardly to the position shown. In the blow-and-blow process the plunger will at a later time be retracted and counterblowing air applied through the passage 136, 146 to counterblow the glass "G" in the mold cavity 13 to the hollow parison shape. This is done by the conection of pipe 58 through its plug 91 in the recess at the lower cylinder head connected to the passage 142. This timed application of fluid under pressure is also under the control of the timing drum 115 and the machine valve 111. Another function of the blow-and-blow process requires the manipulation of the piston 131. This is accomplished by the passage 145 connected into the lower cylinder chamber 149. The passage 145 is formed to make a connection with the upright plug 93 which is in turn connected to the pipe 60. Fluid under pressure will be applied by the timed valve 111 to raise the piston 131 at the initial part of the cycle inserting the thimble 129 into the molding position, as shown on FIG. 5. The pipe 59 of the foot 55 will serve no purpose on the blow-and-blow method of operation, and thus the lower cylinder head 126 of this cylinder assembly is provided with a recessed cap to receive the corresponding plug 92 and cap off this line. In the alternative, the line 59 may be connected to apply air pressure to some other mechanism in the blow-and-blow cylinder, as may be needed or to be used in applying vacuum into the cylinder.

Thus it may be seen that in the above-described mechanism the invention enables a quick conversion between a plunger cylinder, such as 18, to a plunger cylinder, such as 125, with a minimum of disassembly of parts and downtime of the machine. All that is needed to remove the one cylinder assembly, such as 18, to convert to the other type assembly, such as 125, is removal of the fastener rod 44 by a wrench and lifting the cylinder assembly off of the foot 55. This lifting action will automatically disconnect the plug members 91–95 from the recess in the lower cyclinder head of the cylinder assembly. Finally, when the neck cylinder assembly is to be inserted, such as 125, it merely need be lowered onto the foot 55 and the plugs 91–95 will make their automatic connections into the various recesses in the lower cylinder head 126. The cylinder 125 will then be secured in place by the fastener rod 44. Also, the operating height of either cylinder 18 or 125 may be adjusted as needed through the mechanism of the shaft 79, 72 and gearing 71, 68, 88, as described herein.

While embodiments of the present invention have been herein specifically described, other embodiments and variations may occur to those skilled in the art after a knowledge of the disclosure herein, and it is desired to include within the scope of the patent granted hereon all such embodiments and variations, and more particularly as comprehended by the appended claims.

We claim:
1. In combination, a glass forming machine base, a blank mold plunger unit comprising a cylinder, a piston and piston rod in said cylinder, a glass contacting plunger mounted for movement axially at one end of said cylinder and connected to said piston and piston rod, a cylinder end member connected on said cylinder opposite said plunger and closing said cylinder end, plural fluid passages in said cylinder end member which define axial openings on the outer surface of said cylinder end member and include operating fluid passages for furnishing fluid to said cylinder and exhausting fluid from said cylinder in effecting axial movement of the piston in said cylinder, and at least one fluid passage in the cylinder for furnishing fluid under pressure to the plunger unit, a foot member mounted on said machine base, a machine timing valve for regulating timed application of fluid under pressure, plural fluid ports in said foot member and correspondingly aligned with said fluid passages of said cylinder end member, conduit means connecting the fluid ports of said foot member individually to the timing valve, axially outwardly projecting individual plug means connected on the foot member providing detachable fluid couplings insertable into each of said fluid passages of the foot member to detachably connect the passages of the cylinder end member to the machine timing valve, and means detachably connecting said cylinder to said foot member for holding the cylinder in an operating position on said foot member, the machine timing valve providing timed application of operating pressurized fluid to effect timed operation of the blank mold plunger unit.

2. The combination defined in claim 1, wherein said foot member is mounted on the machine base for vertical adjustment by means comprising a vertical standard attached to said base, a lower threaded shaft on said foot, a spider gear rotatably supported on said standard and threadedly connected to said shaft, a drive gear rotatably mounted on said base and in mesh with said spider gear, and a shaft including means for turning the latter connected to rotate the drive gear in either direction, the drive gear turning the spider gear for either raising or lowering the foot position on the machine base.

3. The combination defined in claim 1, wherein each of the plug means forming said detachable fluid connections comprise a hollow connector plug pipe attached to the foot member and connected to a fluid port thereof, the connector pipe projecting above the foot, and a corresponding bored receiver chamber in the end face of said cylinder end member and connected into each fluid passage thereof for receiving the connector pipe and detachably connecting said corresponding fluid ports of the foot member and the cylinder.

4. The combination defined in claim 1, wherein the means detachably connecting said cylinder to said foot member comprises a fastening lug on the upper portion of said cylinder, a fastening rod threaded at one end, said lug being constructed to receive said rod, and threaded means on said foot member engageable with said rod for fastening the cylinder to the foot member.

5. In a glassware forming machine for selectively making blown ware, and pressed and blown ware, a parison forming station, a parison forming mold and a neck ring adapted for use at said station, an air operated neck pin cylinder and reciprocable neck pin unit for use in forming blown ware, and an air-operated plunger cylinder and pressing plunger unit for use in forming pressed and blown ware, said neck pin cylinder unit and pressing plunger cylinder unit being interchangeable, a platen foot having an upper surface disposed beneath said forming mold at the parison forming station, upstanding, outwardly projecting hollow plugs on said upper platen surface, individual fluid conduits connected to said plugs for conducting fluid, each of the cylinders of said neck pin unit and said pressing plunger unit having a lower cylinder head, plural plug receiver bores in each of the cylinder heads of said neck pin cylinder and said plunger cylinder arranged to correspond with and selectively, sealingly receive said plugs, plural fluid passages in each the neck pin unit and the pressing plunger unit each being connected to a corresponding one of said receiver bores, said passages including an operating fluid passage connected to one axial end of each respective cylinder, an operating fluid passage connected to the other axial end of each said respective cylinder, said operating fluid passages of said respective cylinders cooperating to reciprocally operate the piston thereof, an air passage in the neck pin cylinder connected for applying air into the neck mold past the neck pin of said unit in forming glass to a parison shape in making glassware by the blow-and-blow unit, and an air passage in the pressing cylinder unit for applying cooling air to the pressing plunger, the neck pin and pressing plunger units being selectively interchangeable at said parison forming station and means detachably connecting either the neck pin cylinder of said neck pin unit or the pressing cylinder of said pressing plunger unit to said platen foot.

6. In the machine defined by claim 5, a timing valve means for connecting said individual fluid conduits to a source of air under pressure to selectively effect movement of the neck pin vertically into and out of the neck ring and the pressing plunger into and out of the parison forming mold to form glass into parisons in the parison forming mold.

References Cited by the Examiner
UNITED STATES PATENTS 2,755,597  7/1956  Rowe _____ 65—167
3,190,188  6/1965  Donnelly.

DONALL H. SYLVESTER, *Primary Examiner.*
A. D. KELLOGG, *Assistant Examiner.*